Nov. 10, 1942.  G. E. COX ET AL  2,301,617
APPARATUS FOR CONVEYING MATERIAL
Filed June 17, 1941
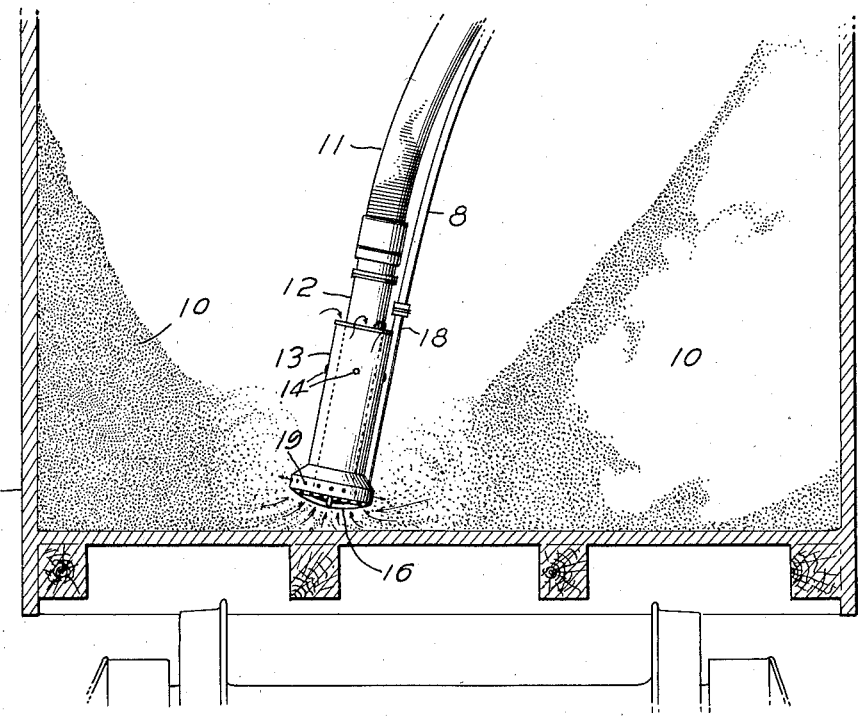
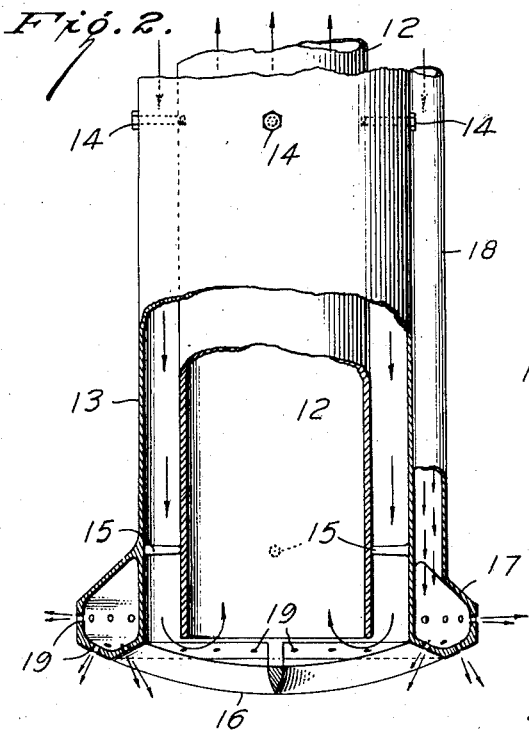
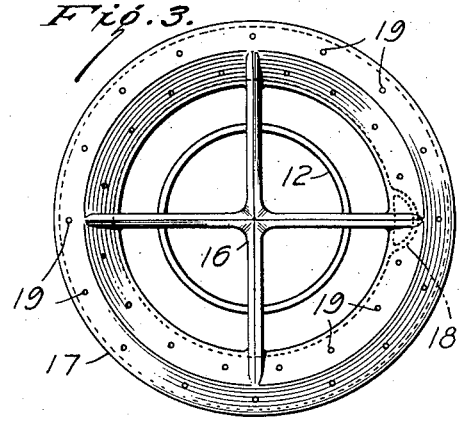
INVENTORS
GEORGE E. COX,
EDWARD D. POWERS,
BY Frank J. Novotny, Jr.
ATTORNEY.

Patented Nov. 10, 1942

2,301,617

UNITED STATES PATENT OFFICE 2,301,617

APPARATUS FOR CONVEYING MATERIAL

George E. Cox, Niagara Falls, N. Y., and Edward D. Powers, Queenston, Ontario, Canada, assignors to American Cyanamid Company, New York, N. Y., a corporation of Maine Application June 17, 1941, Serial No. 398,372

5 Claims. (Cl. 302—58)

This invention relates to apparatus for and a method of loading and unloading and otherwise handling pulverized, granular or similarly comminuted materials or various other relatively uniform and small-sized particles in bulk, such as seeds, crystalline substances, flakes, and the like, and especially such materials as have a tendency to cake, settle or agglomerate. More particularly it embraces an improved suction nozzle for use in an air conveyor system.

The nozzle forming a part of this invention embodies a number of novel features for facilitating the introduction of such materials comprising discrete particles transportable by air or other gases into a conveying system utilizing a current of air or gas for effecting the handling of such pulverulent materials or discrete particles as grains, seeds, soda ash, calcium cyanamide, salt, and the like. After being thus brought into the conveyor system, the materials thus floated by air or other gases will subsequently be found to flow much more readily and remain free flowing for a considerable period of time. Even after prolonged storage in a silo or similar chamber or container, this free-flowing characteristic will still be noticeable.

Heretofore considerable difficulty has been encountered due to caking, settling and agglomerating in the loading, unloading and otherwise handling of granular or pulverulent materials. This has been particularly true where the materials are hygroscopic or even somewhat deliquescent, and especially during damp weather such as frequently accompanies rain or snow. Moreover, when an ordinary intake nozzle forming part of an air conveyor system is used to suck or draw pulverized material out of a storage bin, or to unload a freight car or ship, especially when the material has become compacted or shaken down to a denser mass, as usually happens when it is stored for any great length of time, then the lowering of an intake nozzle into such a compact mass merely results in the formation of a vertical hole from the top to the bottom of the storage bin. This has been found to be particularly troublesome in the case of unloading calcium cyanamide which after being stored for any length of time acquires a 90° angle of repose. The effective handling of such materials frequently necessitated auxiliary shoveling or otherwise breaking up the vertically self-supporting walls of calcium cyanamide.

It is one of the principal objects of this invention to provide apparatus for effectively breaking up compacted, settled or agglomerate materials and conditioning them for introduction into an air conveyor system. A further object is to render such caked and otherwise compacted materials free-flowing and capable of ready air flotation for handling in an air conveying system. A still further object is to provide a dust-free method of, and apparatus for, conveying and otherwise handling pulverulent materials or fines. Another object is to eliminate and avoid the dangers and hazards to which men are subjected when working in an atmosphere containing various deleterious dusts, as for example, calcium cyanamide dust which latter causes, in time, severe dermatitis. Still other and further objects and advantages of the apparatus and method of the present invention will become apparent from the following description and the accompanying drawing showing a specific embodiment of the invention.

In general, this invention attains these objects by providing a method and apparatus wherein a current of air is used to disperse, break up and refloat comminuted or discrete particles of material prior to its introduction, as by suction, into an air conveyor system.

More specifically, the accompanying drawing illustrates a particular embodiment of this invention which for ease of description and also to simplify and facilitate an understanding thereof is shown as used for unloading calcium cyanamide from a freight car. Referring to the drawing:

Figure 1 shows the nozzle lowered, as through a manhole, into the interior of a freight car;

Figure 2 is a detailed view of a portion of the intake end of the nozzle having parts broken away to show its construction more clearly; and Figure 3 is a plan view of the intake end of the nozzle.

Referring now in greater detail to the drawing, a freight car 9, Figure 1, loaded with a material 10, such as calcium cyanamide, salt cake, soap flakes, seeds, and the like, is being emptied in accordance with the principles of the invention and with the apparatus there shown. In all the figures, corresponding parts are similarly numbered. In Figure 1, the flexible hose is connected to the nozzle 12 and conveys air carrying the distended, air floated particles to a cyclone type filter where the particles are separated out and discharged into a storage bin or silo. These particles have their free flowing characteristics so far renewed by this treatment that they can be discharged from the storage silo and conveyed over ordinary equipment to the reaction vessels with considerable ease. The air, after being filtered through bag filters passes to an exhauster of the usual heavy duty rotary type and then through a muffler to the atmosphere. Preferably a number of sets of bag filters are held ready for use, so that they may be used alternately while another set is being cleaned. Cleaning the bags is preferably effected by reversing the air through the filter cloth and simultaneously vibrating the latter to shake the dust free from its surface.

The nozzle itself is designed so as to disperse effectively, aerate and render the particles free flowing. This serves to break up the caked substance and causes the particles comprising it to flow downward towards the mouth of the nozzle. The individual particles are there picked up by the current of air entering the mouth of the nozzle and sucked into the conveyor system. The nozzle consists of a center pipe 12 surrounded by a sleeve 13 of slightly larger diameter. The spacing between the center pipe 12 and the sleeve 13 permits the flow of a down draft of air which is immediately accessible as a source of in-rushing air for conveying the distended particles into the conveyor system. The sleeve is supported and spaced from the center pipe by bolts 14 and lugs 15 which maintain the sleeve and pipe concentric with respect to each other. The mouth of the sleeve 13 is kept open by provision of an X-shaped grill work 16 curved outwardly so as to form a convex frame. This same grill work simultaneously keeps the mouth of the center pipe 11 open thereby giving free access to the inrushing air which conveys the particles into the system.

In order to insure the distending, aerating or breaking up of the compacted particles and to renew their free-flowing characteristics, a hollow perforated ring 17 is provided. This ring may be integral with the mouth end of the sleeve 13. Air under high pressure through auxiliary air hose 8 is intermittently introduced into pipe 18 and then to ring 17 and is emitted in gusts, as shown by the arrows, from the perforations 19 in the ring. This serves to break up the caked or packed particles, and without excessive dusting causes the particles to flow in a distended condition from the sides into the bottom of the hole formed by the nozzle where they are picked up by the inrushing air and conveyed to the storage silo.

In operation, as the distended particles are sucked up through the nozzle, the latter is lowered gradually into the hole that is formed. By operating with compressed air and allowing it to escape through the openings or perforations 19 in the ring 17 a constant feed of free-flowing particles from the sides of the hole flows into the bottom of the hole where it is picked up and drawn into the nozzle.

With this apparatus, a freight or tank car containing, for example, as much as 70 tons of calcium cyanamide can be emptied in a few hours without necessitating any handling or shoveling. This eliminates all losses as by dusting, with its accompanying health hazards to workmen. It simultaneously renews the free-flowing properties of the calcium cyanamide itself, which properties are frequently lost in shipment due to compacting and shaking down of the granular materials. After the center of the car has been emptied, the nozzle can be readily shifted around the edges of the car in order to empty the entire contents of the car and avoid the usual losses encountered in bulk shipments when sweeping and shoveling methods of unloading are used.

In cases where materials adversely affected by the oxygen of the air are to be introduced into a conveyor system of the type herein described, carbon dioxide, nitrogen or other inert gases can be used to break up the agglomerated mass and also to convey the individual particles through the system.

It is to be understood that the examples and the drawing are specific embodiments of the invention, included only for purposes of illustrating the principles involved and that the invention itself is to be limited solely by the scope of the appended claims.

We claim:

1. An intake nozzle for a conveyor system comprising a centrally disposed intake pipe having an opening at one end, an adjustably mounted sleeve concentric with the intake pipe and spaced therefrom to permit the passage of air under atmospheric pressure to the opening, a hollow perforated member affixed to the nozzle and means for admitting air under pressure to the perforated member.

2. An intake nozzle for a conveyor system comprising a centrally disposed intake pipe having an opening at one end, an adjustably mounted sleeve concentric with the intake pipe and spaced therefrom to permit the passage of air under atmospheric pressure to the opening, a hollow perforated ring affixed to the nozzle adjacent to the opening and means for admitting air under pressure to the perforated ring.

3. An intake nozzle for a conveyor system wherein air is used as a carrier for discrete particles of material comprising a centrally disposed intake pipe, having an opening at one end, a sleeve adjustably mounted on and concentric with the intake pipe and spaced therefrom to permit the passage of air under atmospheric pressure to the opening, a guard for the opening to maintain the latter unobstructed for the inflow of air and materials conveyed thereby, a hollow perforated ring affixed to the sleeve adjacent the opening in the intake pipe and means for admitting air under pressure to the perforated ring.

4. An intake nozzle for a conveyor system comprising an internally disposed intake pipe having an opening at one end, an adjustable sleeve concentric with the intake pipe and spaced therefrom to permit the passage of air under atmospheric pressure between the sleeve and the intake pipe to the opening, means for holding the position of the sleeve axially with respect to the intake pipe, a hollow perforated ring affixed to the sleeve, adjustable therewith and adjacent to the opening of the intake pipe and having perforations disposed outwardly and away from the opening in the intake pipe, and means for admitting air under pressure to the perforated member.

5. An intake nozzle for a conveyor system comprising an internally disposed intake pipe having an opening at one end, an adjustable sleeve concentric with the intake pipe and spaced therefrom to permit the passage of air under atmospheric pressure between the sleeve and the intake pipe to the opening, means for holding the position of the sleeve axially with respect to the intake pipe, a hollow perforated ring affixed to the sleeve, adjustable therewith and adjacent to the opening of the intake pipe and having perforations disposed outwardly and away from the opening in the intake pipe, means for admitting air under pressure to the perforated member, and a convex guard extending diametrically across the ring for maintaining the latter unobstructed for the inflow of air and materials conveyed thereby.

GEORGE E. COX.
EDWARD D. POWERS.